United States Patent [19]

Otawa et al.

[11] Patent Number: 4,908,412

[45] Date of Patent: Mar. 13, 1990

[54] THERMOPLASTIC ELASTOMER COMPOSITION EXCELLENT IN HEAT BONDABILITY

[75] Inventors: Yasuhiko Otawa; Toshiyuki Maeda; Kunihide Hiraoka, all of Ichihara; Katsuo Okamoto, Funabashi, all of Japan

[73] Assignee: Mitsui Petrochemical Industries, Ltd., Tokyo, Japan

[21] Appl. No.: 377,803

[22] Filed: Jul. 12, 1989

Related U.S. Application Data

[63] Continuation of Ser. No. 114,026, Oct. 29, 1987, abandoned.

[30] Foreign Application Priority Data

Oct. 29, 1986 [JP] Japan ............................ 61-255915
Oct. 29, 1986 [JP] Japan ............................ 61-255916

[51] Int. Cl.$^4$ ............... C08F 269/00; C08F 277/00; C08F 265/04; C08L 45/00
[52] U.S. Cl. ............................... 525/286; 525/303; 525/211; 525/289; 525/290
[58] Field of Search ............... 525/286, 303, 211, 289, 525/290, 301.5

[56] References Cited

U.S. PATENT DOCUMENTS

| | | | |
|---|---|---|---|
| Re. 32,028 | 11/1985 | Fisher | 525/211 |
| 4,212,787 | 7/1980 | Matsuda et al. | 260/33.6 |
| 4,247,652 | 1/1981 | Matsuda et al. | 525/211 |
| 4,444,950 | 4/1984 | Sakano et al. | 525/74 |
| 4,548,993 | 10/1985 | Garagnani et al. | 525/286 |

Primary Examiner—Lewis T. Jacobs
Assistant Examiner—Susan Berman
Attorney, Agent, or Firm—Sherman and Shalloway

[57] ABSTRACT

A partially crosslinked thermoplastic elastomer composition excellent in the heat bondability is obtained by dynamically heat-treating a blend of a peroxide-crosslinking olefin copolymer and an olefinic plastic with an unsaturated epoxy monomer or an unsaturated hydroxy monomer in the presence of an organic peroxide.

42 Claims, No Drawings

THERMOPLASTIC ELASTOMER COMPOSITION EXCELLENT IN HEAT BONDABILITY

This is a continuation of application Ser. No. 114,026, filed Oct. 29, 1987, now abandoned.

BACKGROUND OF THE INVENTION (1) Field of the Invention

The present invention relates to a thermoplastic elastomer composition having an excellent heat-bondability to various resins and metals and having a high rubbery elasticity and a good moldability. More particularly, the present invention relates to a partially crosslinked thermoplastic elastomer excellent in the heat bondability which is formed by dynamically heat-treating a mixture of a peroxide-crosslinking olefin copolymer rubber and an olefinic plastic with an unsaturated epoxy monomer or an unsaturated hydroxy monomer in the presence of an organic peroxide.

(2) Description of the Prior Art

A thermoplastic elastomer has been known as an energy-saving and resource-saving substitute for a cured rubber.

As the thermoplastic elastomer of this type, there is known, for example, an olefinic thermoplastic elastomer comprising as the main component an ethylene/propylene/non-conjugated diene copolymer rubber. This thermoplastic elastomer is excellent in thermoplastic elastomer performances, but since the bondability to various resins or metals is insufficient, the application range of this thermoplastic elastomer is considerably limited.

Graft modification of the above-mentioned rubber component with maleic anhydride or the like has been tried for improving the bondability. In this case, the bondability is improved, but such a disadvantage as reduction of the rubbery elasticity, the moldability and the like cannot be avoided.

Namely, a thermoplastic elastomer which is excellent in such properties as rubbery elasticity and moldability and has an excellent bondability to various resins and metals has not been known.

SUMMARY OF THE INVENTION

We made research with a view to developing a thermoplastic elastomer being excellent in not only such properties as rubbery elasticity and moldability but also bondability to various resins and metals. As the result, we have now completed the present invention.

More specifically, in accordance with one aspect of the present invention, there is provided a thermoplastic elastomer composition comprising a blend comprising (a) 10 to 100 parts by weight of a peroxide-crosslinking olefin copolymer rubber, (b) 0 to 90 parts by weight of an olefinic plastic, the sum of the amounts of the components (a) and (b) being 100 parts by weight, and (c) 0.01 to 10 parts by weight of an unsaturated epoxy monomer or an unsaturated hydroxy monomer, said thermoplastic elastomer composition being partially crosslinked by dynamically heat-treating said blend in the presence of an organic peroxide.

In accordance with another aspect of the present invention, there is provided a thermoplastic elastomer composition as set forth above, wherein said blend further comprises at least one additive selected from the group consisting of (d) 0 to 100 parts by weight of a peroxide-non-crosslinking rubbery substance, (e) 0 to 200 parts by weight of a mineral oil type softener and (f) 0 to 100 parts by weight of a fibrous filler, per 100 parts by weight of the sum of the components (a) and (b).

In accordance with still another aspect of the present invention, there is provided a thermoplastic elastomer composition as set forth above, wherein the fibrous filler (f) is incorporated after partial crosslinking.

Namely, the most characteristic feature of the present invention resides in that a mixture of a peroxide-crosslinking olefin copolymer rubber and an olefinic plastic is dynamically heat-treated with an unsaturated epoxy monomer or an unsaturated hydroxy monomer in the presence of an organic peroxide to obtain a partially crosslinked thermoplastic elastomer composition.

DETAILED DESCRIPTION OF THE PREFERRED EMBODIMENTS

In the thermoplastic elastomer of the present invention, the peroxide-crosslinking olefin copolymer rubber (a) is a component imparting a rubbery elasticity, and since the component (a) is partially crosslinked, it ensures a high heat resistance.

The olefinic plastic (b) is a component imparting a flowability at an elevated temperature, and by dint of the presence of this component, a predetermined moldability is retained in the thermoplastic elastomer composition.

The unsaturated epoxy monomer or unsaturated hydroxy monomer as the component (c) is a graft modifier and is graft-bonded to the rubber component (a) at the dynamic heat treatment, whereby a good bondability to various resins and metals is imparted to the thermoplastic elastomer composition.

In the present invention, the peroxide-non-crosslinking rubbery substance (d) and the mineral oil softener (e) act as the flowability improver for the rubber component, and the moldability and processability of the composition of the present invention can be improved. Furthermore, the fibrous filler (f) imparts a good dimension stability (low linear expansion coefficient) and a good shape stability (appropriate rigidity) to the composition.

According to the present invention, by the actions of the respective components, the rubbery elasticity, heat resistance and moldability can be maintained at predetermined levels and the bondability to various resins and metals can be highly improved.

Furthermore, if the fibrous filler is incorporated, the dimension stability and shape stability can be simultaneously improved.

The respective components of the thermoplastic elastomer composition of the present invention will now be described.

(a) Peroxide-crosslinking olefin copolymer rubber

The peroxide-crosslinking olefin copolymer rubber used in the present invention is an amorphous elastic copolymer comprising an olefin as the main component, such as an ethylene/propylene copolymer rubber, an ethylene/propylene/non-conjugated diene rubber and an ethylene/butadiene copolymer rubber, and a rubber having such a property that if the rubber is mixed with an organic peroxide and kneaded under heating, the flowability is reduced or lost at all is meant. As the non-conjugated diene, there can be mentioned dicyclopentadiene, 1,4-hexadiene, dicyclooctadiene, methylene-norbornene and ethylidene-norbornone.

Of these copolymer rubber, an ethylene/propylene copolymer rubber and an ethylene/propylene/non-conjugated diene rubber are preferably used, and a copolymer rubber in which the molar ratio between ethylene units and propylene units (ethylene/propylene molar ratio) is from 50/50 to 90/10, especially from 55/45 to 85/15, is preferred. An ethylene/propylene/non-conjugated diene copolymer rubber, particularly an ethylene/propylene/5-ethylidene-2-norbornene copolymer rubber or an ethylene/propylene/5-ethylidene-2-norbornene/dicyclopentadiene quadripolymer, is especially preferred because an thermoplastic elastomer excellent in heat resistance, tensile characteristics and repulsion elasticity can be obtained.

In order to obtain a composition excellent in the tensile characteristics and flowability, it is preferred that the Mooney viscosity $ML_{1+4}$ (100° C.) of the copolymer rubber be 10 to 120, especially 40 to 80.

It also is preferred that the iodine value (unsaturation degree) of the copolymer rubber be smaller than 16. If this requirement is satisfied, a thermoplastic elastomer which is well-balanced between the flowability and the rubbery properties can be obtained.

(b) Olefinic plastic

The olefinic plastic as the component (b) is a crystalline high-molecular-weight solid product obtained by polymerizing at least one mono-olefin according to the high-pressure method or low-pressure method.

For example, there can be mentioned isotactic and syndiotactic mono-olefin homopolymer and copolymer resins, and typical mono-olefin polymer resins are commercially available.

As preferred examples of the mono-olefin, there can be mentioned ethylene, 1-butene, 1-pentene, 1-hexene, 2-methyl-1-propene, 3-methyl-1-pentene, 4-methyl-1-pentene and 5 methyl-1-hexene.

In the present invention, a peroxide-decomposing olefinic plastic and polyethylene are especially preferred as the olefinic plastic.

By the peroxide-decomposing olefinic plastic is meant an olefinic plastic having such a property that if the olefinic plastic is mixed with a peroxide and kneaded under heating, the molecular weight is decreased by thermal decomposition and the flowability of the resin is increased. For example, there can be mentioned isotactic polypropylene and copolymers of propylene with a minor amount of other α-olefin, such as a propylene/ethylene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, especially 5 to 20. In the present invention, the olefinic plastic exerts the effects of improving the flowability and heat resistance of the composition.

(c) Unsaturated epoxy monomer or unsaturated hydroxy monomer

As the unsaturated epoxy monomer used as the component (c) in the present invention, there can be mentioned, for example, glycidyl esters of unsaturated monocarboxylic acids such as glycidyl acrylate, glycidyl methacrylate and glycidyl p-styrylcarboxylate, monoglycidyl and diglycidyl esters of unsaturated polycarboxylic acids such as maleic acid, itaconic acid, citraconic acid, butene-tricarboxylic acid, endo-cis-bicyclo(2,2,1)hept-5-ene-2,3-dicarboxylic acid and endo-cis-bicyclo(2,2,1)hept-5-ene-2-methyl-2,3-dicarboxylic acid, unsaturated glycidyl ethers such as allyl glycidyl ether, 2-methylallyl glycidyl ether, o-allylphenol glycidyl ether, m-allylphenol glycidyl ether m-allylphenol glycidyl ether, p-allylphenol glycidyl ether, isopropenylphenol glycidyl ether, o-vinylphenol glycidyl ether, m-vinylphenol glycidyl ether and p-vinylphenol glycidyl ether, and 2-(o-vinylphenyl)-ethylene oxide, 2-(p-vinylphenyl)-ethylene oxide, 2-(o-vinylphenyl)-propylene oxide, 2-(p-vinylphenyl)-propylene oxide, 2-(o-allylphenyl)-ethylene oxide, 2-(p-allylphenyl)-ethylene oxide, 2-(o-allylphenyl)-propylene oxide, 2-(p-allylphenyl)-propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene mono-oxide and allyl-2,3-epoxy-cyclopentyl ether. Glycidyl acrylate and glycidyl methacrylate are especially preferred.

The unsaturated hydroxy monomer is a monomer having at least one an ethylenic unsaturation bond and at least one hydroxyl group. For example, there can be mentioned hydroxyethyl acrylate, hydroxypropyl acrylate, hydroxyethyl methacrylate, hydroxypropyl methacrylate, polyethylene glycol monomethacrylate and polypropylene glycol monomethacrylate. Hydroxyethyl (meth)acrylate and hydroxypropyl (meth)acrylate are especially preferred.

(d) Peroxide-non-crosslinking rubbery substance

A hydrocarbon type rubbery substance (d) having such a property that even if the rubbery substance is mixed with a peroxide and kneaded under heating, the rubbery substance is not crosslinked and the flowability is not reduced is used as the peroxide-non-crosslinking rubbery substance. For example, there can be mentioned polyisobutylene, butyl rubber, a propylene/ethylene copolymer rubber having a propylene content of at least 70 mole% and atactic polypropylene. In view of the performance and the handling easiness, polyisobutylene is especially preferred as the component (d).

The component (d) exerts a function of improving the flowability and the permanent set of the elastomer composition. It is preferred that the Mooney viscosity of the component (d) be lower than 60.

(e) Mineral oil type softener

The mineral oil type softener as the component (e) is a high-boiling-point petroleum fraction ordinarily used for weakening the intermolecular force of a rubber in roll processing of the rubber to facilitate the processing, assisting the dispersion of carbon black or white carbon incorporated as the filler, or reducing the hardness of a cured rubber to increase the softness and elasticity, and this fraction includes a paraffin type, a naphthene type and an aromatic type.

(f) Fibrous filler

The fibrous filler (f) preferably has a diameter of 0.1 to 15 μm and a length of 5 to 10 μm. As specific examples, there can be mentioned glass fiber (chopped strand, roving, milled glass fiber and glass flake), wollastonite cut fiber, rock fiber, micro fiber, processed mineral fiber, carbon fiber, gypsum fiber, aromatic polyamide fiber and potassium titanate fiber. Of these fillers, milled glass fiber, glass flake and potassium titanate fiber are preferred. In order to further improve the wettability with the thermoplastic elastomer, it is preferred that the fibrous filler be treated with a silane type, chromium type or titanium type coupling agent. The fibrous filler can also be incorporated before the partial crosslinking but the fibrous filler can also be incorporated at the grafting step or the subsequent step.

In the present invention, a polyolefin plastic can be incorporated into the thermoplastic elastomer composition after the partial crosslinking. It is preferred that the polyolefin plastic be incorporated in an amount of up to 300 parts by weight, especially up to 200 parts by weight, per 100 parts by weight of the thermoplastic elastomer composition.

As the polyolefin plastic to be incorporated into the thermoplastic elastomer composition, there can be mentioned, for example, known high-density, medium-density and low-density polyethylenes, isotactic polypropylene and copolymers of propylene with other α-olefin, such as propylene/ethylene copolymer, a propylene/1-butene copolymer, a propylene/1-hexene copolymer and a propylene/4-methyl-1-pentene copolymer. It is preferred that the melt index (ASTM D-1238-65T, 230° C.) of the incorporated olefinic plastic be 0.1 to 50, preferably 5 to 20. In the present invention, the olefinic plastic exerts the effects of improving the flowability and heat resistance of the composition.

Preparation of elastomer composition

According to one preferred embodiment of the present invention, the thermoplastic elastomer composition is prepared by blending (a) 10 to 100 parts by weight, preferably 10 to 95 parts by weight, especially preferably 40 to 95 parts by weight, of the peroxide-crosslinking olefin copolymer rubber, (b) 0 to 90 parts by weight, preferably 5 to 90 parts by weight, especially preferably 5 to 60 parts by weight, of the olefinic plastic (the sum of the amounts of the components (a) and (b) is 100 parts by weight) and (c) 0.01 to 10 parts by weight, especially 0.1 to 5 parts by weight, of the unsaturated epoxy monomer or unsaturated hydroxy monomer and dynamically heat-treating the blend in the presence of an organic peroxide to effect partial crosslinking.

According to another preferred embodiment of the present invention, the thermoplastic elastomer composition is prepared by blending the above-mentioned components (a), (b) and (c) and at least one additive selected from the group consisting of (d) 0 to 100 parts by weight, preferably 5 to 100 parts by weight, especially preferably 5 to 50 parts by weight, of the peroxide-non-crosslinking rubbery substance, (e) 0 to 200 parts by weight, preferably 3 to 100 parts by weight, especially preferably 5 to 80 parts by weight, of the mineral oil type softener and (f) 0 to 100 parts by weight, preferably 1.0 to 100 parts by weight, especially preferably 4 to 35 parts by weight, of the fibrous filler, per 100 parts by weight of the sum of the components (a) and (b), and dynamically heat-treating the blend in the presence of an organic peroxide to effect partial crosslinking.

Incidentally, the fibrous filler may also be added at the graft-bonding step or the subsequent step.

If the copolymer rubber component (a) is used in an amount within the above-mentioned range, a composition excellent in rubbery characteristics such as rubbery elasticity and moldability can be obtained.

If the olefinic plastic (b) and the components (d) and (e) are incorporated in amounts within the above-mentioned ranges, a composition excellent in rubbery characteristics such as rubbery elasticity and, flowability and moldability can be obtained.

The moldability and heat bondability can be improved if the unsaturated epoxy monomer or unsaturated hydroxy monomer (c) is used in an amount within the above-mentioned range.

If the fibrous filler (c) is used in an amount within the above-mentioned range, the flowability, dimension stability and size stability can be improved.

A filler or colorant can be incorporated in the elastomer composition, so far as the flowability (moldability), rubbery characteristics and heat bondability of the final composition are not degraded. As the filler, there can be mentioned calcium carbonate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass bead, shirasu balloon and carbon fiber, and as the colorant, there can be mentioned carbon black, titanium oxide, zinc flower, red iron oxide, ultramarine, prussian blue, an azo pigment, a nitroso pigment, a lake pigment and a phthalocyanine pigment.

Furthermore, in the present invention, known heat stabilizers such as phenol type, sulfite type, phenylalkane type, phosphite type and amine type stabilizers, aging-preventing agents, weathering agents, antistatic agents, and lubricants such as metal soaps and waxes can be incorporated in amounts customarily used for olefinic plastics or olefin copolymer rubbers.

In the present invention, the blend comprising the above-mentioned components is dynamically heat-treated in the presence of an organic peroxide to effect partial crosslinking. By the dynamic heat treatment is meant kneading in the molten state.

As the organic peroxide used in the present invention, there can be mentioned dicumyl peroxide, di-tert-butyl peroxide, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1-bis(tert-butyl-peroxy)-3,3,5-trimethylcyclohexane, n-butyl-4,4-bis(-tert-butylperoxy)valelate, benzoyl peroxide, p-chlorobenzoyl peroxide, 2,4-dichlorobenzoyl peroxide, tert-butyl peroxybenzoate, tert-butyl perbenzoate, tert-butylperoxyisopropyl carbonate, diacetyl peroxide, lauroyl peroxide and tert-butylcumyl peroxide.

Of these peroxides, in view of the smell and scorch stability, 2,5-dimethyl-2,5-di-(tert-butylperoxy)hexane, 2,5-dimethyl-2,5-di-(tert-butylperoxy)hexine-3, 1,3-bis(-tert-butylperoxyisopropyl)benzene, 1,1-bis(tert-butyl-peroxy)-3,3,5-trimethylcyclohexane and n-butyl-4,4-bis(tert-butyl-peroxy)valelate are preferred, and 1,3-bis(tert-butyl-peroxy)valelate are preferred, and 1,3-bis(tert-butylperoxyisopropyl)benzene is most preferred.

The organic peroxide is incorporated in an amount of 0.05 to 3% by weight, especially 0.1 to 1% by weight, based on the total amount of the components (a), (b) and (c).

If the organic peroxide is incorporated in an amount within the above-mentioned range, the heat resistance, the tensile characteristics, the rubbery characteristics such as elastic recovery and repulsion elasticity, and the strength are highly improved.

Known kneading devices such as an open mixing roll, a closed Banbury mixer, an extruder, a kneader and a continuous mixer can be used.

It is preferred that kneading be carried out in a closed apparatus in an atmosphere of an inert gas such as nitrogen or carbon dioxide gas. The kneading temperature is such that the half-value period of the used organic peroxide is shorter than 1 minute. More specifically, the kneading temperature is ordinarily 150 to 280° C. and preferably 170 to 240° C. The kneading time is ordinarily 1 to 20 minutes and preferably 3 to 10 minutes.

In the present invention, at the partial crosslinking treatment with the organic peroxide, there can be used peroxy-crosslinking assistants such as p-quinone dioxime, p,p'-dibenzoylquinone dioxime, N-methyl-N,N-dinitrosoaniline, nitrobenzene, diphenylguanidine, trimethylolpropane-N,N'-m-phenylene maleimide and N-methyl-N,N'-m-phenylene dimaleimide, divinylbenzene, triallyl isocyanurate, polyfunctional methacrylate monomers such as ethylene glycol dimethacrylate, diethylene glycol dimethacrylate, polyethylene glycol dimethacrylate, trimethylolpropane trimethacrylate and allyl methacrylate, and polyfunctional vinyl monomers such as vinyl butyrate and vinyl strearate. It is expected that if such a compound as described above is used, the crosslinking reaction will be advanced uniformly and mildly. In the present invention, especially, if divinylbenzene is used, since divinylbenze is easy to handle, has a good compatibility with the olefinic plastic as the main component to be treated and acts as a dispersing agent for the organic peroxide by its organic peroxide-solubilizing action, a uniform crosslinking effect is attained by the heat treatment and a composition which is well-balanced between the flowability and the physical properties can be obtained. Therefore, use of divinylbenzene is most preferred in the present invention. In the present invention, it is preferred that the above-mentioned crosslinking agent or polyfunctional vinyl monomer be incorporated in an amount of 0.1 to 2% by weight, especially 0.3 to 1% by weight, based on the total amount of the components to be treated. If the amount of the crosslinking assistant or polyfunctional vinyl monomer is incorporated in an amount larger than 2% by weight, when the amount incorporated of the organic peroxide is relatively large, the crosslinking reaction is excessively advanced and the flowability of the composition is degraded, and when the amount incorporated of the organic peroxide is relatively small, the unreacted monomer is left in the composition and the physical properties are changed by the heat history at the step of processing or molding of the composition. Therefore, incorporation of an excessive amount of the crosslinking assistant or polyfunctional vinyl monomer should be avoided.

A decomposition promotor may be incorporated so as to promote decomposition of the organic peroxide. As the decomposition promotor, there can be mentioned tertiary amines such as triethylamine, tributylamine and 2,4,6-tris(di-methylamino)phenol, and naphthenic acid salts of metals such as aluminum, cobalt, vanadium, manganese, magnesium, lead and mercury.

It is preferred that kneading be carried out in a closed apparatus in an atmosphere of an inert gas such as nitrogen or carbon dioxide gas. The kneading temperature is such that the half-value period of the used organic peroxide is shorter than 1 minute. More specifically, the kneading temperature is ordinarily 150° to 280° C. and preferably 170° to 240° C. The kneading time is ordinarily 1 to 20 minutes and preferably 1 to 10 minutes. The shearing force is selected so that the shearing speed is ordinarily 10 to $10^4$ sec$^{-1}$ and preferably $10^2$ to $10^3$ sec$^{-1}$.

As the kneading device, there can be mentioned a mixing roll, an intensive mixer such as a Banbury mixer, a kneader and a monoaxial or biaxial extruder, and use of a closed kneading device is preferred.

According to the present invention, by the above-mentioned dynamic heat treatment, a partially crosslinked and graft-modified thermoplastic elastomer composition can be obtained.

Incidentally, in the present invention, by the term "partial crosslinking", it is meant that the gel content is at least 20%, preferably 20 to 99.5%, especially preferably 45 to 98% as determined according to the following method.

Method for determination of gel content

About 100 mg of a sample of a thermoplastic elastomer is weighed and cut into small pieces having a size of 0.5 mm×0.5 mm×0.5 mm and the cut pieces are immersed in 30 ml of cyclohexane at 23° C. for 48 hours in a sealed vessel. Then, the sample is recovered on a filter paper and dried at room temperature for more than 72 hours until the weight is not changed any more.

The weight of the cyclohexane-insoluble components except the polymer component (for example, fibrous filler, filler, pigment and the like) and the weight of the olefinic plastic in the sample before immersion in cyclohexane are subtracted from the weight of the drying residue. The obtained value is designated as "corrected final weight (Y)".

The weight of the peroxide-crosslinking olefin copolymer in the sample (namely, the value obtained by subtracting ① the weight of the olefinic plastic and ② the weight of the cyclohexane-soluble components other than the peroxide-crosslinking olefin copolymer rubber (for example, mineral oil and plasticizer) ③ and the weight of the cyclohexane-insoluble components other than the polymer component (for example, fibrous filler, filler, pigment and the like) from the weight of the sample) is designated as "corrected initial weight (X)".

The gel content is calculated according to the following formula:

$$\text{Gel content (\% by weight)} = \frac{\text{corrected final weight } (Y)}{\text{corrected initial weight } (X)} \times 100$$

In the present invention, by dynamically heat-treating a blend comprising at specific ratios (a) a peroxide-crosslinking olefin copolymer rubber, (b) an olefinic plastic and (c) an unsaturated carboxylic acid or a derivative thereof, optionally together with (d) a peroxide-non-crosslinking rubbery substance, (e) a mineral oil type softener and (f) a fibrous filler, in the presence of an organic peroxide to effect partial crosslinking, (that is, the gel content is within the above-mentioned range), there can be obtained a composition which is excellent in rubbery characteristics, moldability, bondability to resins and metals, strength, heat resistance and softness.

The composition of the present invention is particularly excellent in heat resistance over the mere blend (uncrosslinkable blend) of the components (a), (b) and (c) or the mere blend (uncrosslinked blend) of the peroxide-crosslinked olefin copolymer rubber component (a) graft-modified with an unsaturated carboxylic acid and the olefinic plastic component (b).

The effect of improving the flowability by incorporation of the components (d) and (e) is especially conspicuous when the gel content is in the above-mentioned range.

The so-obtained thermoplastic elastomer composition of the present invention is excellent in the moldability and can be molded by a molding apparatus customarily used for molding ordinary thermoplastic plastics, and the composition of the present invention is suitable for extrusion molding, calender molding injection molding and the like.

Furthermore, by incorporation of an unsaturated epoxy monomer or unsaturated hydroxy monomer, the polymer component is graft-modified, and therefore, as is apparent from the examples given hereinafter, the heat-bondability to various resin and metals is prominently improved and the composition of the present invention is suitably used for formation of laminates or covering of metals.

The present invention will now be described in detail with reference to the following examples that by no means limit the scope of the invention.

Molding conditions for preparing test samples from elastomer compositions prepared in the examples and test methods are described below.

(1) Injection molding

Molding machine: Dynamelter (supplied by Meiki Seisakusho)

Molding temperature: 220° C.

Injection pressure: Primary pressure of 1000 kg/cm$^2$ and secondary pressure of 700 kg/cm$^2$ Injection speed adopted: maximum Molding speed: 90 sec/cycle Gate: direct gate (land length of 10 mm, width of 10 mm and thickness of 3 mm)

Molded product: length of 150 mm, width of 120 mm and thickness of 3 mm (2) Extrusion molding T-die sheets were prepared by extrusion molding under the following conditions.

Molding machine: extruder having a diameter of 40 mm (supplied by Toshiba Kikai)

Screw: full-flight type (L/D=28, CR=3.5)

Screen pack: 80 mesh×2 sheets

Molding temperature: 160° C. on hopper side and 210° C. on die side

Die type: coat hunger type

Die lip: 1.5 mm

Take-up speed: 5 m/min (3) Basic properties

Test pieces were cut out from square plates having a thickness of 3 mm, which were obtained by injection molding according to the method described in (1) above, and the basic properties were determined according to the following methods.

Tensile characteristics: method of JIS K-6301

M100: stress at 100% stretching $T_B$: tensile strength $E_B$: elongation at break Spring hardness (HS): method A of JIS K-6301 or Shore-D method of ASTM D-2240

Initial flexural modulus (FM): method of ASTM D-790

Permanent elongation (PS): measured by method of JIS K-6301 and expressed by residual elongation at 100% stretching Softening temperature (SP): temperature at which penetration of 0.1 mm was attained by needle having diameter of 0.8 mm under load of 49 g at temperature-elevating rate of 20° C./min in TMA-measuring apparatus supplied by du Pont (4) Bonding strength A. Preparation of test pieces The extrusion sheet (1.0 mm in thickness) of the elastomer composition molded under the conditions described in (2) above and an adherend having a thickness of 0.5 mm were press-molded (mold-clamping pressure of 50 tons) to form a test piece having a size of 150 mm×150 mm.

The following adherends were used.

Nylon: nylon 6 supplied by Toray (Amilane)

EVAL: EP-F101A supplied by Kuraray

Steel sheet: SS-41 supplied by Nippon Test Panel (sand-blasted at surface roughness of 30 microns)

B. Peeling test

Test piece: punched strip having width of 25 mm and length of 100 mm

Test method: 180° peeling

Pulling speed: 25 mm/min

Bonding strength: value (kg/cm) obtained by dividing peeling load by width of test piece Incidentally, in the case where the substrate was broken, the sample was indicated by "broken" in the following tables.

In the present invention, the content ratio between the components (a) and (b) in the elastomer composition can be determined by the D.S.C. method or the infrared absorbency analysis method, and the content of the component (c) can be determined by the infrared absorbance analysis method or the chemical analysis method. The contents of the components (d) and (e) in the composition can be determined by the solvent extraction method (Soxhlet extraction method using acetone as the solvent) or the infrared absorbance analysis method. The content ratio of the component (f) to the organic components can be determined by the thermal weight analysis method.

EXAMPLE 1

A blend comprising 70 parts by weight of an ethylene/propylene/ethylidene-norbornene copolymer rubber having an ethylene content of 70 mole%, an iodine value of 12 and a Mooney viscosity $M_{1+4}$ (100° C.) of 120 (hereinafter referred to as "EPDM") and 30 parts by weight of polypropylene having a melt index (ASTM D-1238-65T, 230° C.) of 13 g/10 min and a density of 0.91 g/cm$^3$ (hereinafter referred to as "PP") was kneaded at 190° C. for 5 minutes in a nitrogen atmosphere by a Banbury mixer, and the kneaded blend was passed through rolls and square pellets were prepared by a sheet cutter.

Then, 100 parts by weight of the so-prepared pellets, 0.5 part by weight of glycidyl methacrylate. (hereinafter referred to as "GMA") and 0.3 part by weight of 1,3-bis(t-butylperoxyisopropyl)benzene hereinafter referred to as "peroxide (A)" were stirred and mixed by a Henschel mixer and the blend was extruded at 220° C. in a nitrogen atmosphere.

The basic properties and bonding strength of the obtained elastomer composition are shown together with other elastomer compositions in Table 1.

EXAMPLE 2 and 3

Thermoplastic elastomers were prepared in the same manner as described in Example 1 except that the amount incorporated of GMA and peroxide (A) were changed.

EXAMPLE 4

A thermoplastic elastomer was prepared in the same manner as described in Example 1 except that 1.0 part by weight of hydroxypropyl methacrylate (hereinafter referred to as "HPMA") was used instead of GMA.

COMPARATIVE EXAMPLE 1

A thermoplastic elastomer was prepared in the same manner as described in Example 1 except that GMA was not incorporated.

EXAMPLES 5 THROUGH 7 AND COMPARATIVE EXAMPLE 2

Thermoplastic elastomers were prepared in the same manner as described in Example 1 while changing the amounts of the respective components.

EXAMPLE 8

In a Henschel mixer, 70 parts by weight of a pelletized ethylene/propylene/ethylidene-norbornene copolymer rubber (Mooney viscosity $ML_{1+4}$ (100° C.)=70, ethylene content=70 mole%, iodine value=10, amount of extending oil=20 parts (accordingly, the amount of the rubber component was 50 parts by weight)), 50 parts by weight of PP (polypropylene), 0.5 part by weight of GMA (glycidyl methacrylate), 0.5 part by weight of DVB (divinylbenzene) and 0.3 part by weight of peroxide (A) was stirred to form a blend.

The blend was extruded at a temperature of 220° C. in a nitrogen atmosphere by using a biaxial extruder having an L/D ratio of 44 and a screw diameter of 53 mm to prepare a thermoplastic elastomer.

The basic properties and bonding strength of the obtained elastomer are shown together with those of the elastomers prepared in the subsequent examples and comparative examples in Table 2.

EXAMPLES 9 AND 10 COMPARATIVE EXAMPLE 3

Thermoplastic elastomers were prepared in the same manner as described in Example 8 while changing the amounts of the respective components.

EXAMPLES 11 THROUGH 15

Thermoplastic elastomer compositions were prepared in the same manner as described in Example 1 except that the amounts incorporated of glycidyl methacrylate (GMA), hydroxypropyl methacrylate (HPMA), divinyl benzene (DVB) and peroxide (A) were changed as shown in Table 1. The obtained results are shown in Table 1.

TABLE 2

|  | E8 | E9 | E10 | R3 |
|---|---|---|---|---|
| Composition |  |  |  |  |
| EPDM | 70*1 | 70*1 | 70*1 | 70*1 |
| PP | 50 | 50 | 50 | 50 |
| GMA | 0.5 | 0 | 3 | 0 |
| HPMA | 0 | 1 | 0 | 0 |
| DVB | 0.5 | 0.5 | 0.5 | 0.5 |
| Peroxide (A) | 0.3 | 0.4 | 0.6 | 0.3 |
| Basic Properties |  |  |  |  |
| $M_{100}$ (Kgf/cm$^2$) | 70 | 72 | 71 | 71 |
| $T_B$ (Kgf/cm$^2$) | 150 | 153 | 155 | 156 |
| $E_B$ (%) | 630 | 620 | 580 | 600 |
| $H_S$ JIS-A | — | — | — | — |
| Shore-D | 38 | 39 | 38 | 38 |
| PS (%) | — | — | — | — |
| FM (Kgf/cm$^2$) | 2500 | 2400 | 2500 | 2400 |
| SP (°C.) | 146 | 148 | 147 | 146 |
| Gel Content (%) | 65 | 60 | 62 | 64 |
| Bonding Strength (Kg/cm) |  |  |  |  |
| to Nylon | 8.2 | 6.8 | broken | 0 |
| to Polyurethane | 1.5 | 5.5 | 3.6 | 0 |
| to Steel Sheet | 8.4 | 7.0 | broken | 0 |

Note
E: example
R: comparative example
*1 the amount of extending oil was 20 parts by weight and hence, the amount of EPDM was 50 parts by weight

EXAMPLE 16

Square pellets were prepared in the same manner as described in Example 1 from 70 parts by weight of EPDM, 30 parts by weight of PP, 10 parts by weight of butyl rubber (IIR-065 supplied by Esso, unsaturation degree=0.8 mole%) (hereinafter referred to as "IIR") and 30 parts by weight of paraffinic process oil (hereinafter referred to as "oil").

Then, a thermoplastic elastomer composition was prepared in the same manner as described in Example 1 by using the so-obtained pellets, 0.5 part by weight of GMA, 0.5 part by weight of DVB and 0.3 part by weight of peroxide (A).

The physical properties and bonding strength of the so-prepared composition are shown together with those of elastomer compositions prepared in the subsequent examples and comparative examples in Table 3.

TABLE 1

|  | E1 | E2 | E3 | E4 | R1 | E5 | E6 | E7 | R2 | E11 | E12 | E13 | E14 | E15 |
|---|---|---|---|---|---|---|---|---|---|---|---|---|---|---|
| Composition |  |  |  |  |  |  |  |  |  |  |  |  |  |  |
| EPDM | 70 | 70 | 70 | 70 | 70 | 30 | 30 | 30 | 30 | 70 | 70 | 70 | 70 | 70 |
| PP | 30 | 30 | 30 | 30 | 30 | 70 | 70 | 70 | 70 | 30 | 30 | 30 | 30 | 30 |
| GMA | 0.5 | 1 | 3 | 0 | 0 | 0.5 | 0 | 3 | 0 | 0.1 | 7 | 0 | 0 | 0 |
| HPMA | 0 | 0 | 0 | 1 | 0 | 0 | 1 | 0 | 0 | 0 | 0 | 0.2 | 0.5 | 3 |
| DVB | 0.5 | 0.5 | 0.5 | 0.5 | 0.5 | 0.5 | 0.5 | 0.5 | 0.5 | 0.5 | 0.5 | 0 | 0.5 | 0.5 |
| Peroxide (A) | 0.3 | 0.4 | 0.6 | 0.4 | 0.3 | 0.3 | 0.4 | 0.6 | 0.3 | 0.2 | 1.0 | 0.2 | 0.3 | 0.6 |
| Basic Properties |  |  |  |  |  |  |  |  |  |  |  |  |  |  |
| $M_{100}$ (Kgf/cm$^2$) | 43 | 45 | 47 | 46 | 45 | 115 | 116 | 118 | 115 | 40 | 49 | 42 | 43 | 47 |
| $T_B$ (Kgf/cm$^2$) | 105 | 108 | 110 | 107 | 109 | 220 | 225 | 225 | 223 | 105 | 112 | 95 | 106 | 112 |
| $E_B$ (%) | 580 | 550 | 550 | 560 | 560 | 640 | 630 | 610 | 630 | 620 | 500 | 550 | 560 | 540 |
| $H_S$, JIS-A | 83 | 84 | 84 | 83 | 84 | — | — | — | — | 83 | 84 | 83 | 84 | 83 |
| Shore-D | — | — | — | — | — | 53 | 54 | 54 | 54 | — | — | — | — | — |
| PS (%) | 20 | 21 | 18 | 20 | 19 | — | — | — | — | 23 | 15 | 20 | 20 | 17 |
| FM (Kgf/cm$^2$) | — | — | — | — | — | 6100 | 6200 | 6200 | 6100 | — | — | — | — | — |
| SP (°C.) | 138 | 140 | 142 | 141 | 140 | 150 | 151 | 150 | 149 | 135 | 141 | 130 | 138 | 140 |
| Gel Content (%) | 96 | 97 | 98 | 97 | 97 | 47 | 48 | 50 | 49 | 92 | 99 | 93 | 96 | 98 |
| Bonding Strength (Kg/cm) |  |  |  |  |  |  |  |  |  |  |  |  |  |  |
| to Nylon | 8.0 | broken | broken | 6.5 | 0 | 8.5 | 6.9 | broken | 0 | 6.0 | broken | 4.5 | 6.0 | 6.5 |
| to Polyurethane | 1.3 | 2.8 | 3.3 | 5.3 | 0 | 1.4 | 5.3 | 3.7 | 0 | 1.4 | 3.6 | 3.8 | 5.0 | 6.3 |
| to Steel Sheet | 8.5 | broken | broken | 7.3 | 0 | 8.8 | 6.8 | broken | 0 | 6.0 | broken | 7.6 | 6.3 | broken |

Note
E: Example
R: Comparative Example

EXAMPLE 17

A thermoplastic elastomer composition was prepared in the same manner as described in Example 16 except that hydroxypropyl methacrylate (hereinafter referred to as "HPMA") was used instead of GMA.

COMPARATIVE EXAMPLE 4

A thermoplastic elastomer composition was prepared in the same manner as described in Example 16 except that GMA was not incorporated.

COMPARATIVE EXAMPLE 5

A thermoplastic elastomer composition was prepared in the same manner as described in Example 16 except that peroxide (A) was not incorporated.

EXAMPLES 18 THROUGH 21

Thermoplastic elastomer compositions were prepared in the same manner as described in Example 16 except that the amounts incorporated of GMA, DVB and peroxide (A) were changed.

EXAMPLES 22 THROUGH 31

Thermoplastic elastomer compositions were prepared in the same manner as described in Example 16 except that the amounts incorporated of the respective components were changed as shown in Table 3. The obtained results are shown in Table 3.

TABLE 3

| | E16 | E17 | R4 | R5 | E18 | E19 | E20 | E21 | E22 |
|---|---|---|---|---|---|---|---|---|---|
| Composition | | | | | | | | | |
| EPDM | 70 | 70 | 70 | 70 | 70 | 70 | 70 | 70 | 70 |
| PP | 30 | 30 | 30 | 30 | 30 | 30 | 30 | 30 | 30 |
| IIR | 10 | 10 | 10 | 10 | 10 | 10 | 10 | 10 | 10 |
| Oil | 30 | 30 | 30 | 30 | 30 | 30 | 30 | 30 | 30 |
| GMA | 0.5 | 0 | 0 | 0.5 | 0.1 | 1.0 | 3 | 5 | 0 |
| HPMA | 0 | 0.5 | 0 | 0 | 0 | 0 | 0 | 0 | 1.0 |
| DVB | 0.5 | 0.5 | 0.5 | 0.5 | 0.5 | 0 | 0.5 | 0.5 | 0.5 |
| Peroxide | 0.3 | 0.3 | 0.3 | 0 | 0.3 | 0.4 | 0.6 | 1.0 | 0.3 |
| Basic Properties | | | | | | | | | |
| M100 (Kgf/cm$^2$) | 26 | 27 | 25 | 20 | 25 | 28 | 29 | 29 | 27 |
| $T_B$ (Kgf/cm$^2$) | 80 | 82 | 81 | 43 | 82 | 85 | 88 | 85 | 80 |
| $E_B$ (%) | 630 | 600 | 600 | 330 | 620 | 560 | 550 | 580 | 600 |
| HS JIS-A | 68 | 68 | 68 | 62 | 67 | 69 | 70 | 69 | 68 |
| PS (%) | 10 | 10 | 11 | 9 | 10 | 9 | 8 | 9 | 10 |
| SP (°C.) | 120 | 121 | 119 | 65 | 122 | 121 | 122 | 121 | 120 |
| Gel Content (%) | 95 | 98 | 96 | 0 | 96 | 97 | 97 | 98 | 98 |
| Bonding Strength (Kg/cm) | | | | | | | | | |
| to Nylon | 7.6 | 3.5 | 0 | below 0.5 | broken | broken | broken | broken | 4.0 |
| to Polyurethane | 1.5 | 4.5 | 0 | 0 | 2.3 | 3.0 | 3.4 | 4.5 | 5.0 |
| to Steel Sheet | 7.8 | 3.5 | 0 | below 0.5 | broken | broken | broken | broken | 4.2 |

| | E23 | E24 | E25 | E26 | E27 | E28 | E29 | E30 | E31 |
|---|---|---|---|---|---|---|---|---|---|
| Composition | | | | | | | | | |
| EPDM | 70 | 70 | 70 | 50 | 50 | 50 | 50 | 50 | 50 |
| PP | 30 | 30 | 30 | 50 | 50 | 50 | 50 | 50 | 50 |
| IIR | 10* | 10 | 0 | 30 | 50 | 80 | 10 | 10 | 10 |
| Oil | 30 | 0 | 30 | 10 | 10 | 10 | 10 | 50 | 70 |
| GMA | 0.5 | 0.5 | 0.5 | 0.5 | 0.5 | 0.5 | 0.5 | 0.5 | 0.5 |
| HPMA | 0 | 0 | 0 | 0 | 0 | 0 | 0 | 0 | 0 |
| DVB | 0.5 | 0.5 | 0.5 | 0.5 | 0.5 | 0.5 | 0.5 | 0.5 | 0.5 |
| Peroxide | 0.3 | 0.3 | 0.3 | 0.3 | 0.4 | 0.5 | 0.3 | 0.4 | 0.4 |
| Basic Properties | | | | | | | | | |
| M100 (Kgf/cm$^2$) | 24 | 35 | 31 | 55 | 24 | 22 | 62 | 25 | 21 |
| $T_B$ (Kgf/cm$^2$) | 81 | 98 | 92 | 130 | 75 | 70 | 145 | 76 | 71 |
| $E_B$ (%) | 630 | 550 | 590 | 580 | 640 | 680 | 600 | 650 | 660 |
| HS JIS-A | 67 | 75 | 71 | 81 | 65 | 62 | 85 | 66 | 61 |
| PS (%) | 10 | 13 | 12 | 25 | 13 | 13 | 22 | 12 | 11 |
| SP (°C.) | 120 | 130 | 127 | 135 | 118 | 114 | 139 | 117 | 115 |
| Gel Content (%) | 96 | 97 | 97 | 95 | 94 | 95 | 94 | 94 | 93 |
| Bonding Strength (Kg/cm) | | | | | | | | | |
| to Nylon | 7.5 | 7.5 | 7.8 | broken | broken | 7.6 | broken | broken | broken |
| to Polyurethane | 1.3 | 1.0 | 1.2 | 1.5 | 1.2 | 1.3 | 1.0 | 1.1 | 1.3 |
| to Steel Sheet | 7.5 | 8.3 | broken | broken | broken | 7.6 | broken | broken | broken |

Note
E: example
R: comparative example
*PIB (polyisobutylene) was used

EXAMPLE 32

In a Banbury mixer, 20 parts by weight of an ethylene/propylene/ethylidene-norbornene copolymer [ethylene content=70 mole%, iodine value=15, Mooney viscosity $M_{1+4}$(100° C.)=120][hereinafter referred to as "EPDM (1)"], 60 parts by weight of PP, 10 parts by weight of IIR, 10 parts by weight of the oil and 5 parts by weight of a milled glass fiber ("Micro Glass Milled Fiber RX-EMFP" supplied by Nippon Sheet Glass, fiber diameter=11 μm, average fiber length=240 μm) (hereinafter referred to as "milled glass fiber") were kneaded at 190° C. for 5 minutes in a nitrogen atmosphere, and the kneaded mixture was passed through rolls and formed into square pellets by a sheet cutter (the first step).

In a Henschel mixer, 100 parts by weight of the so-obtained pellets, 0.3 part by weight of peroxide (A), 0.5 part by weight of DVB and 0.5 part by weight of HPMA were stirred and mixed. Then, the mixture was extruded at 220° C. in a nitrogen atmosphere by an extruder (the second step).

EXAMPLES 33 THROUGH 38

Thermoplastic elastomers were prepared in the same manner as described in Example 32 except that the kind and amount of the filler were changed at the first step, as shown in Table 4.

The following fillers were used.
(Glass flake fiber)
A scaly and filmy glass having a thickness of 3 μm and a 325 mess-pass fraction of at least 88% ("Micro Glass Flake EF 325" supplied by Nippon Sheet Glass) (hereinafter referred to as "glass flake").
(Potassium titanate fiber)
A potassium titanate fiber having a fiber diameter of 0.2 to 0.5 μm and an average fiber length of 10 to 20 μm ("Tismo D" supplied by Otsuka Kagaku Yakuhin) (hereinafter referred to as "potassium titanate").

COMPARATIVE EXAMPLES 6 AND 7

The procedures of Example 32 were repeated in the same manner except that the filler was not added at the first step or HPMA was not added at the second step.

The properties of the compositions obtained in Examples 32 through 38 and Comparative Examples 6 and 7 are shown in Table 4.

EXAMPLE 39

In a Henschel mixer, 50 parts by weight of a pelletized ethylene/propylene/ethylidene-norbornene copolymer rubber [ethylene content=78 mole%, iodine value=10, Mooney viscosity $ML_{1+4}$ (100° C.)=160, content of extending oil=30% by weight (amount of oil =15 parts by weight)] [hereinafter referred to as "EPDM (2)"], 50 parts by weight of PP, 0.5 part by weight of HPMA, 0.5 part by weight of DVB and 0.3 part by weight of 2,5-dimethyl-2,5-di(tert-butylperoxy)-hexine-3 (hereinafter referred to as "peroxide (B)" were stirred and mixed.

The mixture was extruded at 230° C. in a nitrogen atmosphere by using a Warner biaxial extruder (L/D=43, mating type, same rotation direction, three-thread screws) (the first step).

Then, 100 parts by weight of the obtained pellets were kneaded with 5 parts by weight of the milled glass fiber at 200° C. for 5 minutes in a nitrogen atmosphere by means of a Banbury mixer, and the mixture was passed through rolls and formed into square pellets by a sheet cutter (the second step).

EXAMPLES 40 THROUGH 45

The procedures of Example 39 were repeated in the same manner except that the kind and amount of the filler were changed at the second step, as shown in Table 5.

COMPARATIVE EXAMPLES 8 AND 9

The procedures of Example 41 were repeated in the same manner except that the filler was not added at the second step or HPMA was not added at the first step.

The properties of the compositions obtained in Examples 39 through 45 and Comparative Examples 8 and 9 are shown in Table 5.

EXAMPLE 46

In a Henschel mixer, 70 parts by weight of EPDM (2) (50 parts by weight of EPDM and 20 parts by weight of oil), 30 parts by weight of PP, 0.5 part by weight of HPMA, 0.5 part by weight of DVB and 5 parts by weight of the milled glass fiber were stirred and mixed.

Then, the mixture was extruded at 230° C. in a nitrogen atmosphere by means of the above-mentioned Warner biaxial extruder (the first step).

Then, 100 parts by weight of the so-obtained pellets were kneaded with 5 parts by weight of the milled glass fiber at 200° C. for 5 minutes in a nitrogen atmosphere by a Banbury mixer, and the mixture was passed through rolls and formed into square pellets by a sheet cutter (the second step).

EXAMPLES 47 THROUGH 52

The procedures of Example 46 were repeated in the same manner except that the kind and amount of the filler were changed at the second step, as shown in Table 6.

COMPARATIVE EXAMPLES 10 AND 11

The procedures of Example 46 were repeated in the same manner except that the filler was not added at the second step or HPMA was not added at the first step.

The properties of the compositions obtained in Examples 46 through 52 and Comparative Examples 10 and 11 are shown in Table 6.

EXAMPLE 53

The procedures of Example 46 were repeated in the same manner except that two kinds of fillers shown in Table 6 were used. The obtained results are shown in Table 6.

EXAMPLES 54 THROUGH 56

The procedures of Example 32 were repeated in the same manner except that glycidyl methacrylate (GMA), allylglycidyl ether (AGE) or hydroxyethyl acrylate (HEA) was used instead of HPMA. The obtained results are shown in Table 4.

TABLE 4

|  | E32 | E33 | E34 | E35 | E36 | E37 | E38 | R6 | R7 | E54 | E55 | E56 |
|---|---|---|---|---|---|---|---|---|---|---|---|---|
| Composition |  |  |  |  |  |  |  |  |  |  |  |  |
| First Step H |  |  |  |  |  |  |  |  |  |  |  |  |
| Polymer |  |  |  |  |  |  |  |  |  |  |  |  |
| EPDM (1) | 20 | 20 | 20 | 20 | 20 | 20 | 20 | 20 | 20 | 20 | 20 | 20 |
| PP | 60 | 60 | 60 | 60 | 60 | 60 | 60 | 60 | 60 | 60 | 60 | 60 |
| OIL | 10 | 10 | 10 | 10 | 10 | 10 | 10 | 10 | 10 | 10 | 10 | 10 |
| IIR | 10 | 10 | 10 | 10 | 10 | 10 | 10 | 10 | 10 | 10 | 10 | 10 |

TABLE 4-continued

| | E32 | E33 | E34 | E35 | E36 | E37 | E38 | R6 | R7 | E54 | E55 | E56 |
|---|---|---|---|---|---|---|---|---|---|---|---|---|
| Fibrous Filler | | | | | | | | | | | | |
| Milled glass fiber | 5 | 15 | 25 | | | | | | 15 | 5 | 5 | 5 |
| Glass flake | | | | 15 | | | | | | | | |
| Potassium titanate | | | | | 5 | 15 | 25 | | | | | |
| Second Step | | | | | | | | | | | | |
| (H) | 100 | 100 | 100 | 100 | 100 | 100 | 100 | 100 | 100 | 100 | 100 | 100 |
| HPMA | 0.5 | 0.5 | 0.5 | 0.5 | 0.5 | 0.5 | 0.5 | 0.5 | | GMA 0.5 | AGE 0.5 | HEA 0.5 |
| DVB | 0.5 | 0.5 | 0.5 | 0.5 | 0.5 | 0.5 | 0.5 | 0.5 | 0.5 | 0.5 | 0.5 | 0.5 |
| Peroxide (A) | 0.3 | 0.3 | 0.3 | 0.3 | 0.3 | 0.3 | 0.3 | 0.3 | 0.3 | 0.3 | 0.3 | 0.3 |
| Basic Properties | | | | | | | | | | | | |
| $M_{100}$ (Kgf/cm$^2$) | 113 | 145 | 185 | 120 | 118 | 138 | 170 | 100 | 135 | 109 | 112 | 110 |
| $T_B$ (Kgf/cm$^2$) | 205 | 248 | 278 | 225 | 215 | 240 | 265 | 190 | 140 | 215 | 210 | 213 |
| $E_B$ (%) | 620 | 550 | 530 | 510 | 610 | 550 | 530 | 650 | 280 | 600 | 580 | 610 |
| HS (shore-D) | 49 | 53 | 57 | 51 | 49 | 52 | 55 | 47 | 51 | 49 | 50 | 49 |
| Gel Content (%) | 47 | 47 | 48 | 47 | 47 | 47 | 47 | 47 | 46 | 48 | 48 | 47 |
| Other Properties | | | | | | | | | | | | |
| Heat Resistance - heat sagging (mm) (120° C.) | 5 | 3 | 2 | 6 | 6 | 3 | 2 | 8 | 5 | 5 | 5 | 5 |
| Cold Resistance - Izod impact strength (kg·cm/cm) (−20° C.) | NB* | NB* | 26.8 | NB* | NB* | NB* | 29.1 | NB* | NB* | NB* | NB* | NB* |
| Shape Stability - initial flexural modulus (kgf/cm$^2$) | 4500 | 5100 | 5500 | 4800 | 4600 | 5000 | 5300 | 4200 | 4400 | 4600 | 4600 | 4600 |
| Dimension Stability - linear expansion coefficient × 10$^{-6}$ (mm/mm/°C.) | 100 | 80 | 60 | 100 | 110 | 70 | 60 | 140 | 130 | 110 | 110 | 110 |

Note
E: Example
R: Comparative Example
NB: not broken

TABLE 5

| | E39 | E40 | E41 | E42 | E43 | E44 | E45 | R8 | R99 |
|---|---|---|---|---|---|---|---|---|---|
| Composition | | | | | | | | | |
| First Step I | | | | | | | | | |
| Polymer | | | | | | | | | |
| EPDM (2) | 50 | 50 | 50 | 50 | 50 | 50 | 50 | 50 | 50 |
| (EPDM) | (35) | (35) | (35) | (35) | (35) | (35) | (35) | (35) | (35) |
| (OIL) | (15) | (15) | (15) | (15) | (15) | (15) | (15) | (15) | (15) |
| PP | 50 | 50 | 50 | 50 | 50 | 50 | 50 | 50 | 50 |
| HPMA | 0.5 | 0.5 | 0.5 | 0.5 | 0.5 | 0.5 | 0.5 | 0.5 | — |
| DVB | 0.5 | 0.5 | 0.5 | 0.5 | 0.5 | 0.5 | 0.5 | 0.5 | 0.5 |
| Peroxide (B) | 0.3 | 0.3 | 0.3 | 0.3 | 0.3 | 0.3 | 0.3 | 0.3 | 0.3 |
| Second Step | | | | | | | | | |
| Fibrous Filler | | | | | | | | | |
| (I) | 100 | 100 | 100 | 100 | 100 | 100 | 100 | 100 | 100 |
| Milled glass fiber | 5 | 10 | 15 | | | | | — | 15 |
| Glass flake | | | | 10 | | | | — | |
| Potassium titanate | | | | | 10 | 20 | 30 | — | |
| Basic Properties | | | | | | | | | |
| $M_{100}$ (Kgf/cm$^2$) | 87 | 97 | 106 | 85 | 90 | 107 | 135 | 80 | 100 |
| $T_B$ (Kgf/cm$^2$) | 172 | 185 | 210 | 170 | 180 | 220 | 265 | 150 | 110 |
| $E_B$ (%) | 560 | 520 | 490 | 490 | 510 | 450 | 420 | 600 | 210 |
| HS (Shore-D) | 43 | 44 | 46 | 43 | 44 | 46 | 48 | 41 | 43 |
| Gel Content (%) | 56 | 55 | 56 | 56 | 56 | 56 | 56 | 55 | 52 |
| Other Properties | | | | | | | | | |
| Heat Resistance - heat sagging (mm) (120° C.) | 5 | 4 | 3 | 7 | 5 | 2 | 2 | 10 | 8 |
| Cold Resistance - Izod impact strength (kg·cm/cm) (−20° C.) | NB* | NB* | NB* | NB* | NB* | NB* | 24.8 | NB* | NB* |
| Shape Stability - initial flexural modulus (Kgf/cm$^2$) | 3500 | 3900 | 4200 | 3400 | 3700 | 4400 | 5300 | 3100 | 3800 |
| Dimension Stability - linear expansion coefficient × 10$^{-6}$ (mm/mm/°C.) | 110 | 90 | 60 | 100 | 90 | 70 | 60 | 160 | 100 |

Note
E: Example
R: Comparative Example
NB: not broken

TABLE 6

|  | E46 | E47 | E48 | E49 | E50 | E51 | E52 | R10 | R11 | E53 |
|---|---|---|---|---|---|---|---|---|---|---|
| Composition | | | | | | | | | | |
| Polymer | | | | | | | | | | |
| EPDM (2) | 70 | 70 | 70 | 70 | 70 | 70 | 70 | 70 | 70 | 70 |
| (EPDM) | (50) | (50) | (50) | (50) | (50) | (50) | (50) | (50) | (50) | (50) |
| (OIL) | (20) | (20) | (20) | (20) | (20) | (20) | (20) | (20) | (20) | (20) |
| PP | 30 | 30 | 30 | 30 | 30 | 30 | 30 | 30 | 30 | 30 |
| Fibrous Filler | | | | | | | | | | |
| Milled glass fiber | 5 | 10 | 20 | | | | | 10 | | |
| Glass flake | | | | 10 | | | | | | 10 |
| Potassium titanate | | | | | 10 | 20 | 30 | | | 10 |
| Additives | | | | | | | | | | |
| HPMA | 0.5 | 0.5 | 0.5 | 0.5 | 0.5 | 0.5 | 0.5 | 0.5 | — | 0.5 |
| DVB | 0.5 | 0.5 | 0.5 | 0.5 | 0.5 | 0.5 | 0.5 | 0.5 | 0.5 | 0.5 |
| Peroxide (B) | 0.3 | 0.3 | 0.3 | 0.3 | 0.3 | 0.3 | 0.3 | 0.3 | 0.3 | 0.3 |
| Basic Properties | | | | | | | | | | |
| $M_{100}$ (Kgf/cm$^2$) | 69 | 78 | 100 | 70 | 75 | 92 | 115 | 60 | 72 | 88 |
| $T_B$ (Kgf/cm$^2$) | 137 | 155 | 200 | 140 | 145 | 190 | 225 | 120 | 85 | 175 |
| $E_B$ (%) | 530 | 480 | 430 | 450 | 500 | 450 | 400 | 580 | 240 | 440 |
| HS (Shore-D) | 37 | 39 | 41 | 37 | 38 | 40 | 44 | 35 | 37 | 40 |
| Gel Content (%) | 78 | 78 | 79 | 78 | 78 | 78 | 77 | 78 | 75 | 78 |
| Other Properties | | | | | | | | | | |
| Heat Resistance - heat sagging (mm) (120° C.) | 11 | 8 | 5 | 9 | 8 | 4 | 3 | 16 | 14 | 5 |
| Cold Resistance - Izod impact strength (kg · cm/cm) (−20° C.) | NB* | NB* | NB* | NB* | NB* | NB* | 22.8 | NB* | NB* | NB* |
| Shape Stability - initial flexural modulus (Kgf/cm$^2$) | 2500 | 2800 | 3700 | 2400 | 2700 | 3600 | 4400 | 2100 | 2300 | 3500 |
| Dimension Stability - linear expansion coefficient × $10^{-6}$ (mm/m°C.) | 100 | 80 | 60 | 100 | 80 | 60 | 50 | 160 | 140 | 70 |

Note
E: Example
R: Comparative Example
NB: not broken

We claim:

1. A thermoplastic elastomer composition comprising a blend comprising (a) 10 to 100 parts by weight of a peroxide-crosslinking olefin copolymer rubber, (b) 0 to 90 parts by weight of an olefinic plastic, the sum of the amounts of the components (a) and (b) being 100 parts by weight, and (c) 0.01 to 10 parts by weight of an unsaturated hydroxy monomer, said thermoplastic elastomer composition being partially crosslinked by dynamically heat-treating said blend in the presence of an organic peroxide.

2. A thermoplastic elastomer composition as set forth in claim 1, wherein said blend further comprises at least one additive selected from the group consisting of (d) 0 to 100 parts by weight of a peroxide-non-crosslinking rubbery substance, (e) 0 to 200 parts by weight of a mineral oil type softener and (f) 0 to 100 parts by weight of a fibrous filler, per 100 parts by weight of the sum of the components (a) and (b).

3. A thermoplastic elastomer composition as set forth in claim 2, wherein the fibrous filler is incorporated in the thermoplastic elastomer before partial crosslinking or at the grafting step or after the partial crosslinking.

4. A thermoplastic elastomer composition as set forth in claim 1, wherein the proportion of component (a) is 10 to 95 parts by weight and the proportion of component (b) is 5 to 90 parts by weight.

5. A thermoplastic elastomer composition as set forth in claim 4, wherein said blend further comprises at least one additive selected from the group consisting of (d) 0 to 100 parts by weight of a peroxide-non-crosslinking rubbery substance, (e) 0 to 200 parts by weight of a mineral oil type softener and (f) 0 to 100 parts by weight of a fibrous filler, per 100 parts by weight of the sum of the components (a) and (b).

6. The thermoplastic elastomer composition as set forth in claim 5, wherein the fibrous filler is incorporated in the thermoplastic elastomer before partial crosslinking or at the grafting step or after the partial crosslinking.

7. A thermoplastic elastomer composition as set forth in claim 1, wherein the peroxide-crosslinking olefin copolymer rubber is selected from the group consisting of ethylene/propylene copolymer rubber, ethylene/propylene/non-conjugated diene rubber and ethylene/butadiene copolymer rubber.

8. A thermoplastic elastomer composition as set forth in claim 7, wherein the peroxide-crosslinking olefin copolymer rubber is ethylene/propylene copolymer rubber or ethylene/propylene/non-conjugated diene rubber and the ethylene/propylene molar ratio is from 50/50 to 90/10.

9. A thermoplastic elastomer composition as set forth in claim 8, wherein the ethylene/propylene molar ratio is from 55/45 to 85/15.

10. A thermoplastic elastomer composition as set forth in claim 1, wherein the Mooney Viscosity $ML_{1+4}$ (100° C.) of the peroxide-crosslinking olefin copolymer rubber is from 10 to 120.

11. A thermoplastic elastomer composition as set forth in claim 10, wherein said Mooney Viscosity $ML_{1+4}$ (100° C.) is from 40 to 80.

12. A thermoplastic elastomer composition as set forth in claim 1, wherein the iodine value of the peroxide-crosslinking olefin copolymer rubber is less than 16.

13. A thermoplastic elastomer composition as set forth in claim 1, wherein the olefinic plastic is isotactic polypropylene or a copolymer of propylene with a minor amount of another α-olefin.

14. A thermoplastic elastomer composition as set forth in claim 1, wherein the melt index (ASTM D-1238-65T, 230° C.) of the olefinic plastic is from 0.1 to 50.

15. A thermoplastic elastomer composition as set forth in claim 14, wherein said melt index is from 5 to 20.

16. A thermoplastic elastomer composition as set forth in claim 1, wherein the unsaturated hydroxy monomer is hydroxyethyl (meth)acrylate, hydroxypropyl (meth)acrylate, polyethylene glycol monomethacrylate or polypropylene glycol monomethacrylate.

17. A thermoplastic elastomer composition as set forth in claim 16, wherein said unsaturated hydroxy monomer is hydroxyethyl (meth)acrylate or hydroxypropyl (meth)acrylate.

18. A thermoplastic elastomer composition as set forth in claim 2, wherein the peroxide-non-crosslinking rubbery substance is polyisobutylene, butyl rubber, propylene/ethylene copolymer having a propylene content of at least 70 mole % or atactic polypropylene.

19. A thermoplastic elastomer composition as set forth in claim 18, wherein said peroxide-non-crosslinking rubbery substance is polyisobutylene.

20. A thermoplastic elastomer composition as set forth in claim 4, wherein the proportion of component (a) is 40 to 95 parts by weight and the proportion of component (b) is 5 to 60 parts by weight.

21. A thermoplastic elastomer composition as set forth in claim 1, wherein the proportion of component (c) is 0.1 to 5 parts by weight.

22. A thermoplastic elastomer composition as set forth in claim 1, wherein the organic peroxide is incorporated in an amount of 0.05 to 3% by weight based on the total amount of components (a), (b) and (c).

23. A thermoplastic elastomer composition as set forth in claim 22, wherein said organic peroxide is incorporated in an amount of 0.1 to 1% by weight based on the total amount of components (a), (b) and (c).

24. A thermoplastic elastomer composition comprising a blend comprising (a) 10 to 100 parts by weight of a peroxide-crosslinking olefin copolymer rubber, (b) 0 to 90 parts by weight of an olefinic plastic, the sum of the amounts of the components (a) and (b) being 100 parts by weight, and (c) 0.01 to 10 parts by weight of an unsaturated epoxy monomer selected from the group consisting of a glycidyl ester of an unsaturated monocarboxylic acid, a diglycidyl ester of an unsaturated polycarboxylic acid, an unsaturated glycidyl ether, 2-(o-vinylphenyl)-ethylene oxide, 2-(p-vinylphenyl)-ethylene oxide, 2-(o-vinylphenyl)-propylene oxide, 2-(p-vinylphenyl)-propylene oxide, 2-(o-allylphenyl)-ethylene oxide, 2-(p-allylphenyl)-ethylene oxide, 2-(o-allylphenyl)-propylene oxide, 2-(p-allylphenyl)-propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene mono-oxide and allyl 3,3-epoxycyclopentyl ether, said thermoplastic elastomer composition being partially crosslinked by dynamically heat-treating said blend in the presence of an organic peroxide.

25. A thermoplastic elastomer composition as set forth in claim 24, wherein said unsaturated epoxy monomer is glycidyl acrylate or glycidyl methacrylate.

26. A thermosetting elastomer composition as set forth in claim 24, wherein the proportion of component (a) is 10 to 95 parts by weight and the proportion of component (b) is 5 to 90 parts by weight.

27. A thermoplastic elastomer composition as set forth in claim 26, wherein said blend further comprises at least one additive selected from the group consisting of (d) 0 to 100 parts by weight of a peroxide-non-crosslinking rubbery substance, (e) 0 to 200 parts by weight of a mineral oil type softener and (f) 0 to 100 parts by weight of a fibrous filler, per 100 parts by eight of the sum of the components (a) and (b).

28. A thermoplastic elastomer composition as set forth in claim 27, wherein the fibrous filler is incorporated in the thermoplastic elastomer before partial crosslinking or at the grafting step or after the partial crosslinking.

29. A thermoplastic elastomer composition as set forth in claim 24, wherein the peroxide-crosslinking olefin copolymer rubber is selected from the group consisting of ethylene/propylene copolymer rubber, ethylene/propylene/non-conjugated diene copolymer rubber and ethylene/butadiene copolymer rubber.

30. A thermoplastic elastomer composition as set forth in claim 29, wherein the peroxide-crosslinking olefin copolymer is ethylene/propylene copolymer rubber or ethylene/propylene/non-conjugated diene copolymer rubber and the ethylene/propylene molar ratio is from 50/50 to 90/10.

31. A thermoplastic elastomer composition as set forth in claim 30, wherein the ethylene/propylene molar ratio is from 55/45 to 85/15.

32. A thermosetting elastomer composition as set forth in claim 24, wherein the Mooney viscosity $ML_{1+4}$ (100° C.) of the peroxide-crosslinking olefin polymer is from 10 to 120.

33. A thermoplastic elastomer composition as set forth in claim 32, wherein said Mooney viscosity $ML_{1+4}$ (100° C.) is from 40 to 80.

34. A thermoplastic elastomer composition as set forth in claim 24, wherein the iodine value of the peroxide-crosslinking olefin copolymer rubber is less than 16.

35. A thermoplastic elastomer composition as set forth in claim 24, wherein the olefinic plastic is isotactic polypropylene or a copolymer of propylene with a minor amount of another alpha-olefin.

36. A thermoplastic elastomer composition as set forth in claim 24, wherein the melt index (ASTM D-1238-65T, 230° C.) of the olefinic plastic is from 0.1 to 50.

37. A thermoplastic elastomer composition as set forth in claim 36, wherein said melt index is from 5 to 20.

38. A thermoplastic elastomer composition as set forth in claim 27, wherein the peroxide-non-crosslinking rubbery is polyisobutylene, butyl rubber, propylene/ethylene copolymer having a propylene content of at least 70 mole % or atactic polypropylene.

39. A thermoplastic elastomer composition as set forth in claim 38, wherein said peroxide-non-crosslinking rubbery substance is polyisobutylene.

40. A thermoplastic elastomer composition as set forth in claim 26, wherein the proportion of component (a) is 40 to 95 parts by weight and the proportion of component (b) is 5 to 60 parts by weighty.

41. A thermoplastic elastomer composition as set forth in claim 24, wherein the proportion of component (c) is 0.1 to 5 parts by weight.

42. A thermoplastic elastomer composition as set forth in claim 24, wherein the organic peroxide is incorporated in an amount of 0.05 to 3% by weight based on the total amount of components (a), (b) and (c).

* * * * *